H. F. HITNER.
APPARATUS FOR BLOWING GLASS CYLINDERS.
APPLICATION FILED JUNE 8, 1909.
987,137.
Patented Mar. 21, 1911.
2 SHEETS—SHEET 1.
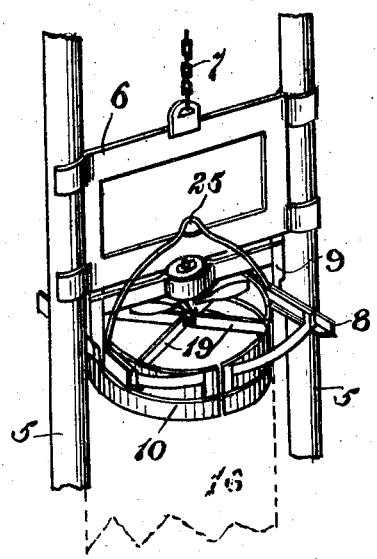
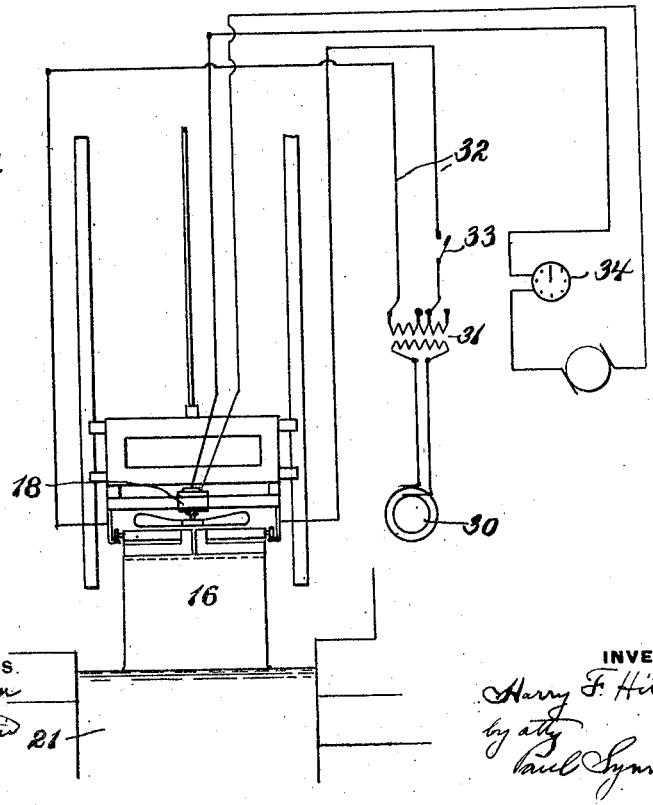
WITNESSES.
INVENTOR
Harry F. Hitner
by atty
Paul Synnestvedt H. F. HITNER.
APPARATUS FOR BLOWING GLASS CYLINDERS.
APPLICATION FILED JUNE 8, 1909.

987,137.

Patented Mar. 21, 1911.
2 SHEETS—SHEET 2.

WITNESSES
Harvey L. Lechner
Archworth Martin

INVENTOR
Harry F. Hitner
by atty
Paul Synnestvedt

UNITED STATES PATENT OFFICE.

HARRY F. HITNER, OF MOUNT VERNON, OHIO, ASSIGNOR TO PITTSBURGH PLATE GLASS COMPANY, OF PITTSBURG, PENNSYLVANIA, A CORPORATION OF PENNSYLVANIA.

APPARATUS FOR BLOWING GLASS CYLINDERS.

987,137.      Specification of Letters Patent.      Patented Mar. 21, 1911.

Application filed June 8, 1909. Serial No. 500,862.

*To all whom it may concern:*

Be it known that I, HARRY F. HITNER, a citizen of the United States, residing at Mount Vernon, in the county of Knox and State of Ohio, have invented certain new and useful Improvements in Apparatus for Blowing Glass Cylinders, of which the following is a specification.

This invention has for its primary object the provision of an improved apparatus for supplying a pressure or blast to the interior of a glass cylinder while the same is being drawn, which blowing apparatus is subject to more perfect control than that ordinarily employed, and can be operated to secure a regulation of very low pressures with the greatest nicety.

Another object of this improvement is the elimination of the ordinary blow-pipe or common form of pressure supplying device ordinarily used in forming glass cylinders, and the provision of a bait of such character that the air can be blown directly into the open end of the cylinder without the interposition of any pipe or other fluid-pressure inlet means such as is ordinarily used.

The above, as well as such other objects as may hereinafter appear, I attain by means of a construction which I have illustrated in preferred form in the accompanying drawings—wherein Figure 1 illustrates in a perspective view the application of my improvement to a drawing apparatus or drawing cage;

Figure 2 shows the wiring diagram which I employ in conjunction with the rest of the mechanism;

Figure 3:
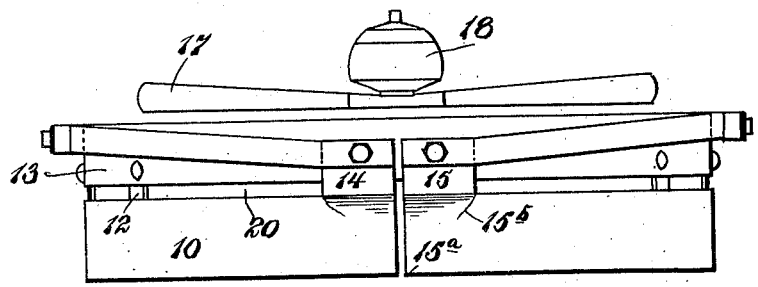
Figure 3 is a side elevation of my improved form of bait and blowing device applied thereto.

Referring now more particularly to Figure 1, it will be seen that I have therein indicated a couple of upright guide columns 5 between which is mounted the drawing cage 6 attached to hoisting cable 7 which latter may be operated from any preferred hoisting device such as is commonly employed.

Figure 4:
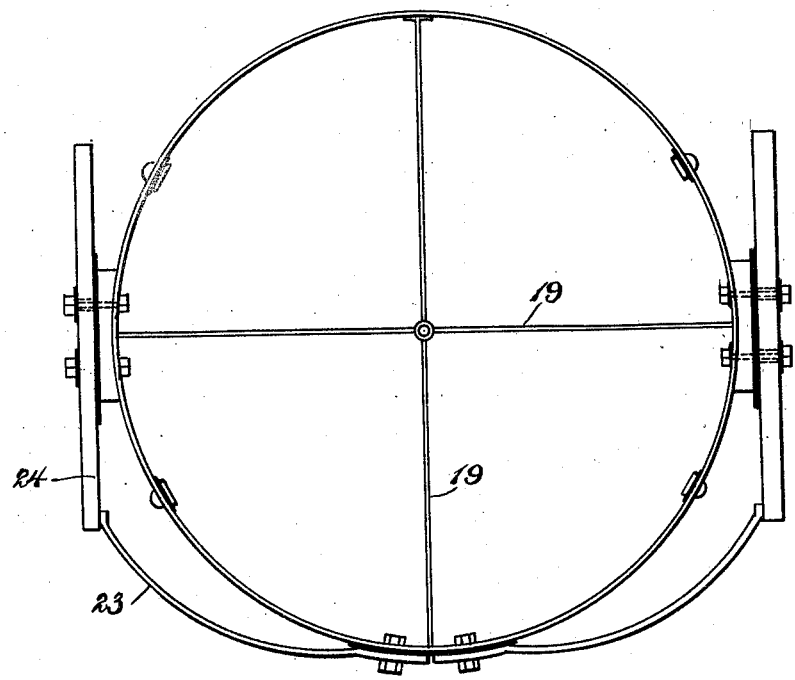
Figure 4 is a plan view of the construction shown in Figure 3.

At the lower end of the hoisting cage 6 I provide a couple of supporting shelves 8 preferably formed of angle irons carried on the downward extensions 9 from the cage, but insulated from the latter. The bait 10 is composed of a ring of highly resisting metal supported by suitable cross supports 12 (Figures 3 & 4) from an upper frame part 13, the strip of metal 10 having the current admitted by connections indicated at 14 and 15 in Figure 3, so that the electric circuit will pass around through the strip 10, coming in at one of the terminals, say 14, and passing out of the other, 15, after obtaining a heating effect upon the bait, by the resistance of the particular metal used in the ring 10, which is also non-corrosive in character.

In order to secure proper heating effect in the corner $15^a$ I make a short slot at $15^b$ to force the current downward, and somewhat restrict the conductivity below the part marked 15. Similar slots or like restrictive means may be used where found desirable.

The ring 10 is preferably made of substantially the same diameter as the cylinder 16 which is to be drawn, and above the part 13 there is mounted a revolving blower fan 17 arranged to be actuated by some suitable device, as for example the electric motor indicated diagrammatically at 18, the fan and motor being placed in position so that on revolution of the blades of the fan a down current of air into the upper open mouth of the cylinder 16 will be obtained.

I have found by experiment that to get the right pressure effect within the cylinder it is desirable in the preferred form of my mechanism to use one or a plurality of cross bars 19 shown most clearly in Figure 1, to prevent a whirling action of the air current within the cylinder, and to get a better disposition of the pressure due to the action of the fan. I have also found that the best results are obtained by separating the blades of the fan a little from the upper face of the cross bars 19 and the connected parts 13, and by having an outlet or opening 20 between the part 13 and the strip 10, said outlet serving apparently to produce more uniform and satisfactory pressure within the cylinder the lower end of which of course is closed by the surface of the metal within the tank from which the cylinder is being drawn, as indicated at 21 in Figure 2.

As a means for supplying current to the band 10 I provide the connections 23 leading to a horizontal bar 24 adapted to rest upon the angle iron bracket or supporting shelf 8 and carry the current from the conducting wires. The weight of the glass cylinder resting upon the angle iron brackets 8 through the horizontal bars 24, is sufficient to maintain ordinarily a satisfactory contact, but other additional contact devices could be used, for supplying the current to the band 10 if required.

As a means for taking hold of the drawing devices and removing them from the cage 6 within which latter the blowing apparatus is mounted, I provide the loop connection 25 shown in Figure 1, which can be engaged by any suitable takedown device if it is desired to take down the cylinder mechanically.

As a means for supplying heat to heat the bait, I provide the generator 30 and a transformer 31, the lines 32 of the transformer leading to the connections that are attached to the angle iron brackets 8.

The fan motor 18 is operated by current from a generator 35, a rheostat 34 being provided for regulating the movement of the fan.

As a means for opening and closing the circuit in the wires 32, I provide a switch 33 which may be of any well known construction.

The operation of my invention is as follows. The band 10 of the drawing device being lowered so as to become immersed at its lower edge in the surface of the glass in the furnace, the hoisting mechanism is started and at the same time the operation of the blower 17, and as the drawing cage 6 is gradually elevated the blower fan by its motion creates a gentle downward blast into the open upper end of the cylinder 16 which is gradually being formed by the upward motion of the bait or band 10, and when the cylinder has reached its full length the lower end is severed in any of the customary methods and the cylinder taken down and cut up as usual. The pressure necessary in the formation of a cylinder of this character which is of the same diameter as the bait I find to be extremely light, and the arrangement of open upper end together with the nicety of control possible with the blower fan makes it possible to secure just the desired amount necessary without too much and without liability to blow out the cylinder and secure an uneven or irregular surface.

Having thus described my invention and illustrated its use, what I claim as new and desire to secure by Letters Patent, is the following:

1. An apparatus for blowing glass cylinders, comprising in combination, a bait having substantially the same size opening at both ends, and blowing mechanism operating immediately above said open ended bait, to supply a current of air directly to the interior of the cylinder attached to said bait, substantially as described.

2. An apparatus for blowing glass cylinders comprising a bait provided with an air passage of relatively large diameter, and a blowing fan facing the upper end of the passage whereby a current of air is supplied directly to the interior of the cylinder.

3. An apparatus for blowing glass cylinders, comprising in combination, an open ended bait, blowing apparatus for supplying a current of air to the interior of the cylinder attached to said bait, and devices within said open ended bait to prevent or control gyratory motion of the air current within the cylinder.

4. An apparatus for blowing glass cylinders comprising a tubular bait, and a fan spaced away from the upper end of the bait and facing such bait whereby an unconfined body of air is forced from the fan and into the upper end of the bait thus supplying a relatively large quantity of air at low pressure to the interior of the cylinder.

5. An apparatus for blowing glass cylinders comprising a bait provided with an air passage of relatively large diameter, and a blowing fan facing the upper end of the passage whereby a current of air is supplied directly to the interior of the cylinder, lateral outlet means being provided intermediate the fan and the lower edge of the bait.

6. An apparatus for blowing glass cylinders, comprising in combination, a bait having substantially the same size opening at both ends, and a fan located on the axis of the opening for forcing air directly into the cylinder.

In testimony whereof I have hereunto signed by name in the presence of the two subscribed witnesses.

HARRY F. HITNER.

Witnesses:
ARCHWORTH MARTIN,
HARVEY L. LECHNER.

Copies of this patent may be obtained for five cents each, by addressing the "Commissioner of Patents, Washington, D. C."